United States Patent
Yasukawa (10) Patent No.: US 9,266,346 B2
(45) Date of Patent: Feb. 23, 2016

(54) COLOR MIXING DETECTION METHOD, COLOR MIXING DETECTION APPARATUS, AND PRINTING APPARATUS FOR INKJET PRINTING HEAD

(71) Applicant: CANON KABUSHIKI KAISHA, Tokyo (JP)

(72) Inventor: Tetsuro Yasukawa, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/468,692

(22) Filed: Aug. 26, 2014

(65) Prior Publication Data
US 2015/0062208 A1    Mar. 5, 2015

(30) Foreign Application Priority Data

Sep. 2, 2013   (JP) .................. 2013-181556

(51) Int. Cl.
| | |
|---|---|
| *B41J 29/393* | (2006.01) |
| *B41J 2/21* | (2006.01) |
| *H04N 1/60* | (2006.01) |

(52) U.S. Cl.
CPC .................. *B41J 2/21* (2013.01); *H04N 1/6033* (2013.01)

(58) Field of Classification Search
CPC ............ B41J 2/211; B41J 2/2056; B41J 2/20; G06K 15/02; G06K 15/107; G06K 15/1865
USPC ............. 347/6, 19, 24, 5, 9, 14, 15; 358/3.13, 358/3.14, 3.21
See application file for complete search history.

(56) References Cited

U.S. PATENT DOCUMENTS

| | | | | |
|---|---|---|---|---|
| 5,917,517 | A * | 6/1999 | Kida .................... | B41J 2/16511 347/33 |
| 6,505,010 | B1 * | 1/2003 | Izumizaki et al. ............... | 399/39 |
| 9,079,417 | B1 * | 7/2015 | Yasukawa ............ | G06K 15/107 |
| 2004/0001211 | A1 * | 1/2004 | Ogasawara et al. ............ | 358/1.9 |
| 2006/0284944 | A1 * | 12/2006 | Kudo ................... | B41J 2/17509 347/85 |
| 2009/0231604 | A1 * | 9/2009 | Miura ............................ | 358/1.9 |
| 2012/0224006 | A1 * | 9/2012 | Saito et al. ...................... | 347/62 |

FOREIGN PATENT DOCUMENTS

| | | | |
|---|---|---|---|
| JP | 10-151753 | A | 6/1998 |
| JP | 10151753 | A * | 6/1998 |

* cited by examiner

*Primary Examiner* — Stephen Meier
*Assistant Examiner* — Sharon A Polk
(74) *Attorney, Agent, or Firm* — Fitzpatrick, Cella, Harper & Scinto (57) ABSTRACT

An ink color mixing in an inkjet printing head can be securely detected without being influenced by foreign matters such as the existence of dust and without requiring a complicated image processing. To realize this, the occurrence of a color mixing is detected when a printing density-changed part of a printed image of an inspection pattern continuously extends over a predetermined range or more in a direction in which the printing head is moved relative to the printing medium during the printing of the inspection pattern.

8 Claims, 11 Drawing Sheets

COLOR MIXING DETECTION METHOD, COLOR MIXING DETECTION APPARATUS, AND PRINTING APPARATUS FOR INKJET PRINTING HEAD

BACKGROUND OF THE INVENTION

1. Field of the Invention

The present invention relates to a color mixing detection method, a color mixing detection apparatus, and a printing apparatus for detecting the color mixing of ink caused in an inkjet printing head.

2. Description of the Related Art

Inkjet printing heads (hereinafter referred to as printing heads) provided in an inkjet printing apparatus include those capable of ejecting a plurality of colors of inks through different ejection ports. Generally, a manufacture step of such a printing head includes an inspection step to detect a color mixing in which a different color of ink is mixed in the printing head. Specifically, ink is ejected from a manufactured printing head to print an evaluation pattern on a printing medium. Then, based on the color shade of the printed pattern, the occurrence of the color mixing in the printing head is detected.

Japanese Patent Laid-Open No. H10-151753(1998) discloses a method of detecting a change of a color shade of a printed image due to the color mixing in ink for example. Specifically, an image is printed on a printing medium by key color inks. Then, the result of reading the image is compared with a stored acceptable range of the color shades of the key colors to thereby determine whether the printed image has a correct color shade or not.

According to the detection method disclosed in Japanese Patent Laid-Open No. H10-151753(1998), the occurrence of the color mixing is detected only based on the change of the color shade of the printed image. Thus, if the color shade changes due to foreign matters (e.g., dust) existing on the printing medium, it is difficult to detect the occurrence of the color mixing with a high accuracy.

SUMMARY OF THE INVENTION

The present invention provides a color mixing detection method, a color mixing detection apparatus, and a printing apparatus by which the occurrence of the ink color mixing in an inkjet printing head can be securely detected without being influenced by the existence of dust for example and without requiring a complicated image processing.

In the first aspect of the present invention, there is provided a color mixing detection method for detecting an occurrence of a color mixing of ink in an inkjet printing head that can eject at least first and second inks having different colors, comprising:

a printing step of allowing the printing head and a printing medium to move relative to each other in a first direction while allowing the first ink to be ejected through the printing head so that an inspection pattern having a uniform density is printed on the printing medium by the first ink;

a density measurement step of measuring a density of a printed image of the inspection pattern; and a detection step of detecting the occurrence of the color mixing of the first and second inks when a density-changed part in the printed image in which the density measured by the density measurement step deviates from an allowable density continuously extends in the first direction for a predetermined range or more.

In the second aspect of the present invention, there is provided a color mixing detection apparatus for detecting the occurrence of a color mixing of ink in an inkjet printing head that can eject at least first and second inks having different colors, comprising:

a printing unit configured to allow the printing head and the printing medium to move relative to each other in a first direction while allowing the first ink to be ejected through the printing head so that an inspection pattern having a uniform density is printed on the printing medium by the first ink;

a density measurement unit configured to measure a density of a printed image of the inspection pattern; and a detection unit configured to detect the occurrence of the color mixing of the first and second inks when a density-changed part in the printed image in which the density measured by the density measurement unit deviates from an allowable density continuously extends in the first direction for a predetermined range or more.

In the third aspect of the present invention, there is provided a printing apparatus for printing an image on a printing medium by allowing an inkjet printing head that can eject at least first and second inks having different colors and a printing medium to move relative to each other in a first direction, comprising:

a printing unit configured to allow the printing head and the printing medium to move relative to each other in a first direction while allowing the first ink to be ejected through the printing head so that an inspection pattern having a uniform density is printed on the printing medium by the first ink;

a density measurement unit configured to measure a density of a printed image of the inspection pattern; and a detection unit configured to detect the occurrence of the color mixing of the first and second inks when a density-changed part in the printed image in which the density measured by the density measurement unit deviates from an allowable density continuously extends in the first direction for a predetermined range or more.

According to the present invention, the occurrence of a color mixing is detected when a printing density-changed part of a printed image of an inspection pattern continuously extends over a predetermined range or more in a direction in which the printing head is moved relative to the printing medium during the printing of the inspection pattern. As a result, the occurrence of a color mixing in ink in the printing head can be securely detected without being influenced by the existence of foreign matters (e.g., dust) and without requiring a complicated image processing.

Further features of the present invention will become apparent from the following description of exemplary embodiments (with reference to the attached drawings).

DESCRIPTION OF THE EMBODIMENTS

The following section will describe an embodiment of the present invention with reference to the attached drawings.

First Embodiment

Figure 1:
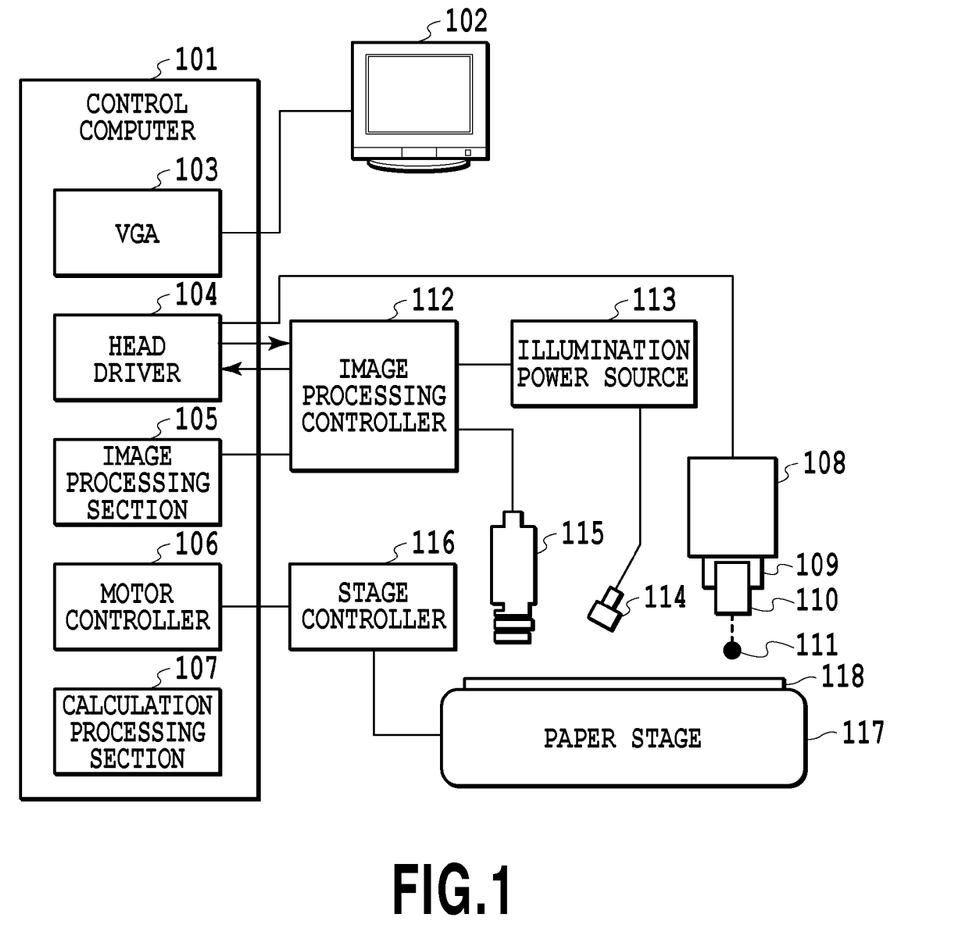
FIG. 1 is a schematic view illustrating a configuration of a detection apparatus in the first embodiment of the present invention.

FIG. 1 is a schematic view illustrating a color mixing detection apparatus of an inkjet printing head in this embodiment.

A control computer 101 includes therein a board for VGA 103 connected to a monitor 102. The control computer 101 includes therein a head driver 104 for outputting a driving signal for an inkjet printing head 110, a board for an image processing section 105, and a board for a motor controller 106 that are collectively controlled. A calculation processing section 107 provided in the control computer 101 subjects, to a high-speed calculation processing, image data taken from the image processing section 105.

The printing signal outputted from the head driver 104 is converted by a printing signal converter 108 to a signal corresponding to the printing head 110. The converted signal is inputted, via a carriage 109 including the printing head 110, to the printing head 110 via a contact probe unit (not shown). Depending on the signal, the printing head 110 ejects ink droplets 111 to allow the ink droplets 111 to land on a printing medium 118, thereby printing an image. The printing medium 118 is placed on a paper stage 117 and is closely attached on the paper stage 117 by vacuum for example. The printing medium 118 in this example has a coated surface so that the ink droplets 111 landed on the surface can be equally absorbed. The paper stage 117 has an encoder (not shown) for obtaining stage position information regarding the moving position. The position of the paper stage 117 is controlled by a stage controller 116 connected to the motor controller 106 of the control computer 101 so that the printed image on the printing medium 118 is correctly within the angle of field of a CCD camera 115.

The printed image within the angle of field of the CCD camera 115 is illuminated by an illumination apparatus 114 connected to an illumination power source 113. The photographing data of the CCD camera 115 is sent via the image processing controller 112 to the image processing section 105. The illumination apparatus 114 of this example uses an LED that can output the respective R, G, and B wavelengths and that can provide durability and light intensity stability.

The illumination power source 113 has an external control terminal. The image processing controller 112 controls the light intensities of the lights of the respective R, G, and B wavelengths. In the case of this example, the CCD camera 115 is a line sensor-type CCD camera. The line sensor-type CCD camera is relatively low-cost but has a high resolution and can acquire only a requiring part of the printed image. By using such a line sensor-type CCD camera, a small amount of image data can be taken with regard to a high resolution image, thus improving the image processing speed. The CCD camera 115 also may be an area sensor-type CCD camera so long as the image processing section 105 can achieve a high speed image processing with a sufficient processing capability.

The color mixing detection system as shown in FIG. 1 may be configured by combining a plurality of apparatuses or may be configured by a single apparatus.

Figure 2:
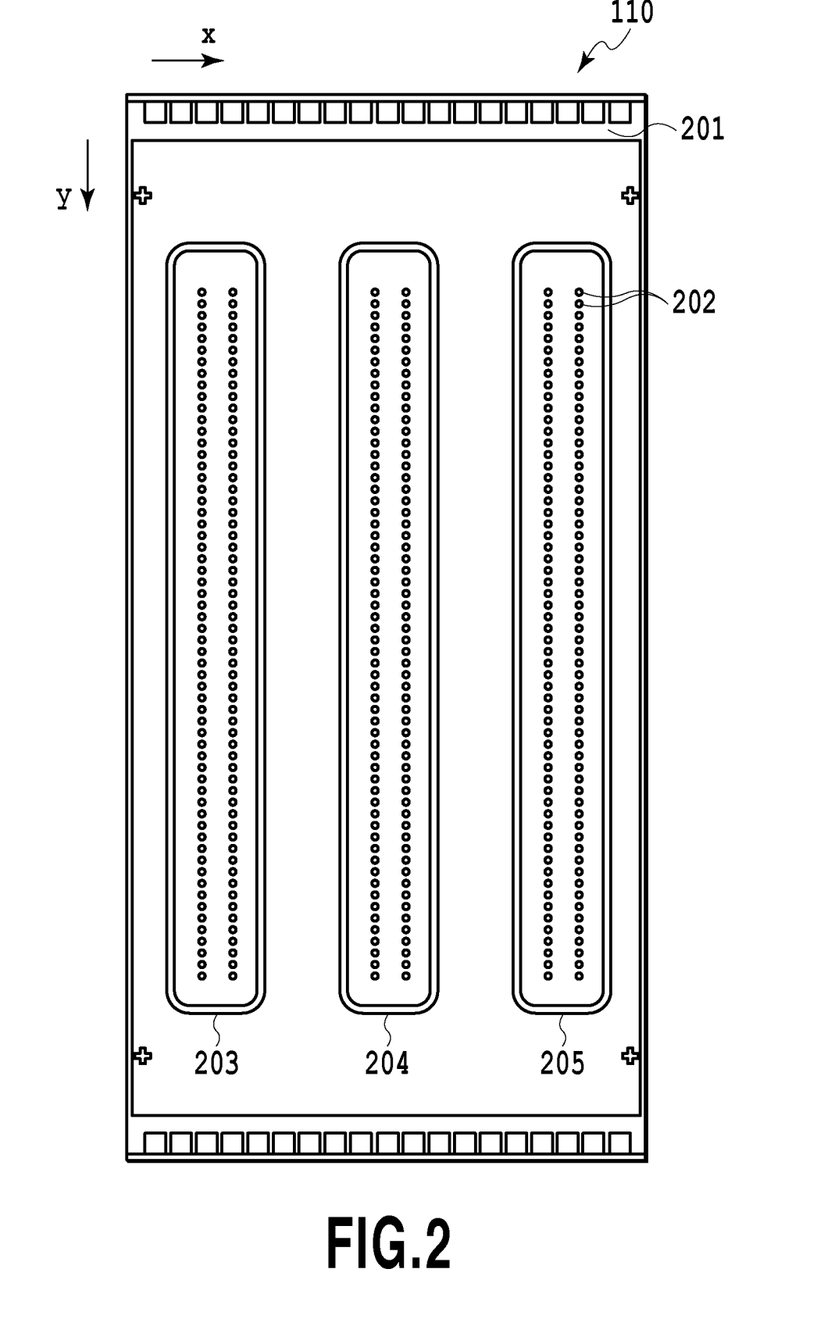
FIG. 2 is an expanded view illustrating an ejection port part of a printing head in FIG. 1.

FIG. 2 is a schematic view for explaining the printing head 110 as a subject of the detection of color mixing.

The printing head 110 is configured so that ink can be ejected through a plurality of ink ejection ports 202 arranged on a printing element substrate 201. An ink ejection method includes a method of using an electromechanical converter such as a piezoelectric element, and a method of irradiating electromagnetic waves such as laser to heat ink to use this heat to eject ink. Other ejection methods include a method of using an electrothermal transducing element (heater) having a heat-generating resistor to heat ink to foam ink so that the foaming energy is used to eject ink. The printing head 110 of this example uses the latter electrothermal transducing element (heater) to eject ink and has, at the lower side of the ejection port 202, an electrothermal transducing element functioning as an ejection energy generating element for generating ink ejection energy.

The printing head 110 of this example includes an ejection port array 203 for cyan ink ejection, an ejection port array 204 for magenta ink ejection, and an ejection port array 205 for yellow ink ejection. By using the printing head 110 including such a printing element substrate 201, a color image can be printed. The printing head 110 includes therein ink paths for the respective ink colors. Thus, inks in ink paths adjacent to each other may have therebetween a color mixing. The printing head 110 of FIG. 2 may have color mixing that may be caused between cyan ink and magenta ink accommodated in ejection port arrays 203 and 204 adjacent to each other and between magenta ink and yellow ink accommodated in ejection port arrays 204 and 205 adjacent to each other. Thus, ink for which color mixing may be caused can be identified in advance.

Next, the following section will describe a method of detecting color mixing in the printing head in this embodiment.

Figure 3:
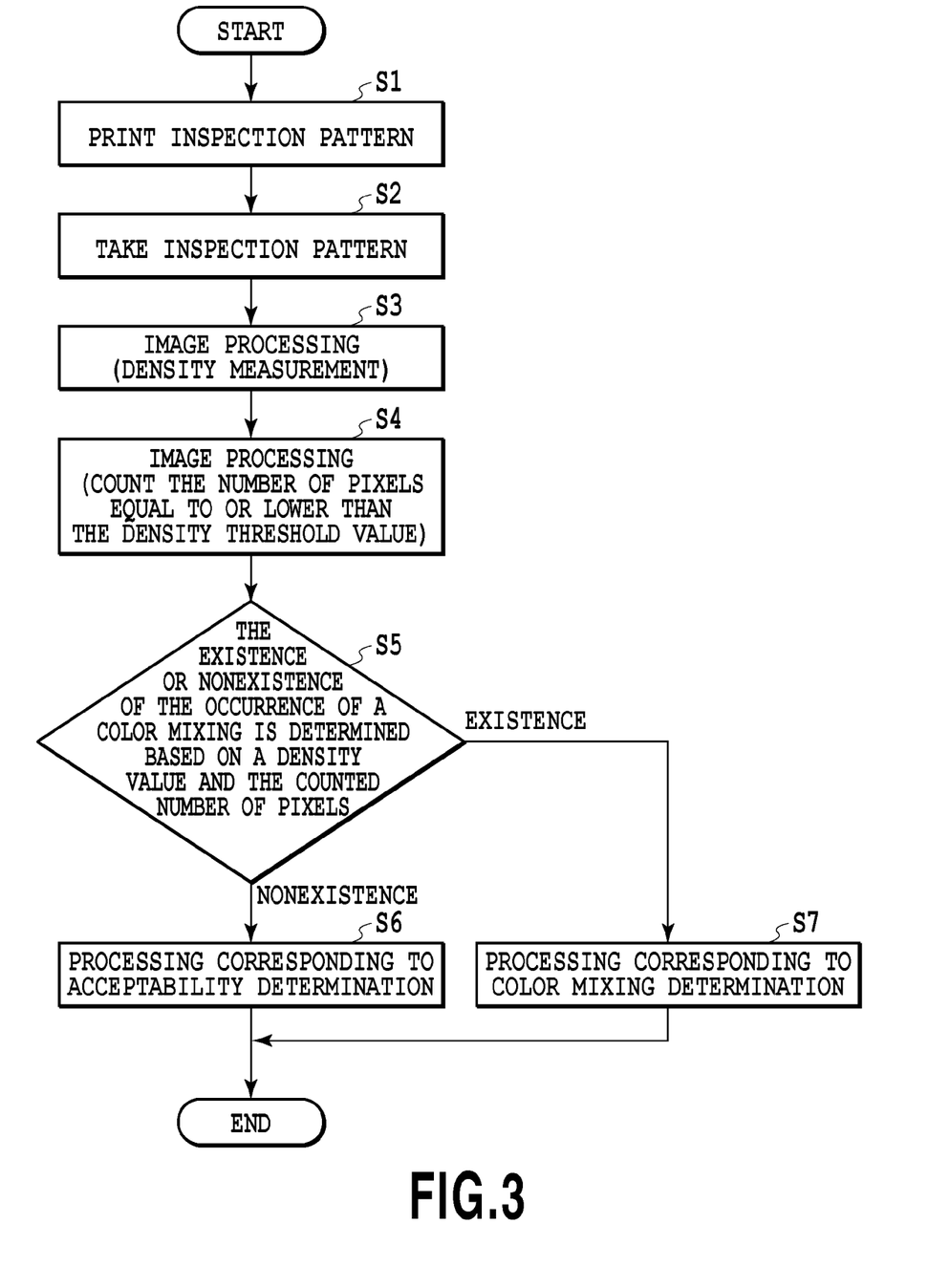
FIG. 3 is a flowchart for explaining a detection method in the first embodiment of the present invention.
Figure 4:
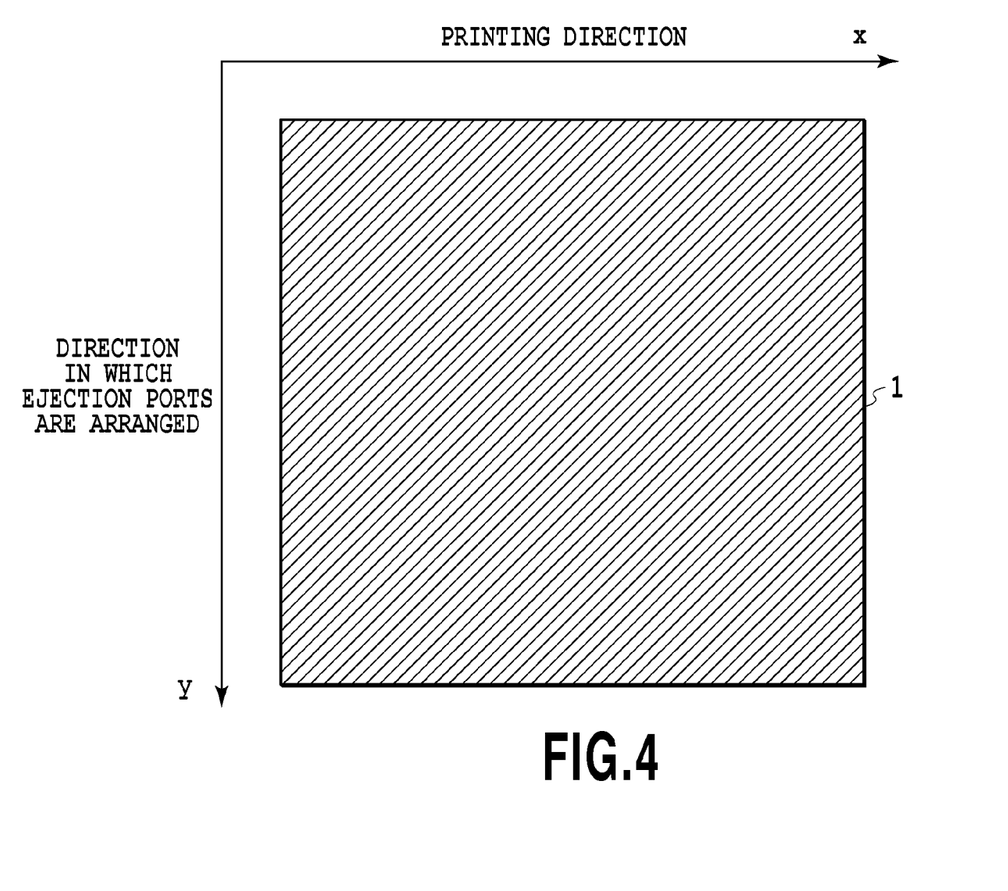
FIG. 4 is a diagram for explaining an inspection pattern.

FIG. 3 is a flowchart for explaining the color mixing detection method in this embodiment. FIG. 4 is a diagram for explaining an inspection pattern.

First, in Step S1 of FIG. 3, ink droplets 111 of a single color ejected through the ejection port 202 of the printing head 110 are used to print a inspection pattern 1 having a uniform density as shown in FIG. 4 on the printing medium 118. Specifically, the inspection pattern 1 is printed by moving the printing head 110 and the printing medium relative to each other in a printing direction shown by an arrow x (first direction) while allowing ink to be ejected through the ejection port 202 for ejecting the ink of the same color ink. The printing direction is a direction intersecting with (or, in this example, being orthogonal with) a direction along which the ejection port array extends (second direction) that is a direction along which the ejection port 202 is arranged.

As shown in FIG. 4, the inspection pattern 1 is a patch pattern having 100% printing duty (which is an ink coverage rate of a unit region of the printing medium 118). The inspection pattern 1 may be a pattern having a uniform density and is not limited to a 100% printing duty only. The total of three single color inspection patterns 1 are printed by cyan ink, magenta ink, and yellow ink ejected through the printing head 110, respectively. The inspection pattern 1 is a pattern for which all ejection ports 202 in the printing head 110 can be subjected to a color mixing inspection. As described later, the occurrence of ink color mixing can be detected while being distinguished from foreign matters (e.g., dust).

Next, in Step S2, the inspection pattern 1 is taken by the CCD camera 115. Then, the imaging data is read by the image processing controller 112. During taking the inspection pattern 1, light is irradiated to the inspection pattern 1 from the illumination apparatus 114. A light source and a light intensity are set so that a photographed image having a high contrast can be obtained to thereby easily detect a color mixing part in the image processing after taking the inspection pattern 1. For example, an ink color for which a color mixing may be caused can be irradiated with light of color complementary to the ink color to thereby more clearly show the difference between a color mixing part and a no-color mixing part. Some combinations of ink for printing the inspection pattern 1 (first ink) and an ink color mixed with the first ink (the second ink) may cause a printed image of the inspection pattern 1 having a reduced density or an increased density. In this embodiment, the inspection pattern 1 is taken by the CCD camera 115 under such taking conditions that cause, due to an ink color mixing, an taken image of the inspection pattern 1 having a reduced density. For example, light of color satisfying the taking conditions as described above for example is emitted by the illumination apparatus 114.

Next, in Steps S3 and S4, the taken image of the inspection pattern 1 is subjected to an image processing to measure the density and to count the number of pixels having a density equal to or lower than a threshold value.

Figure 5:
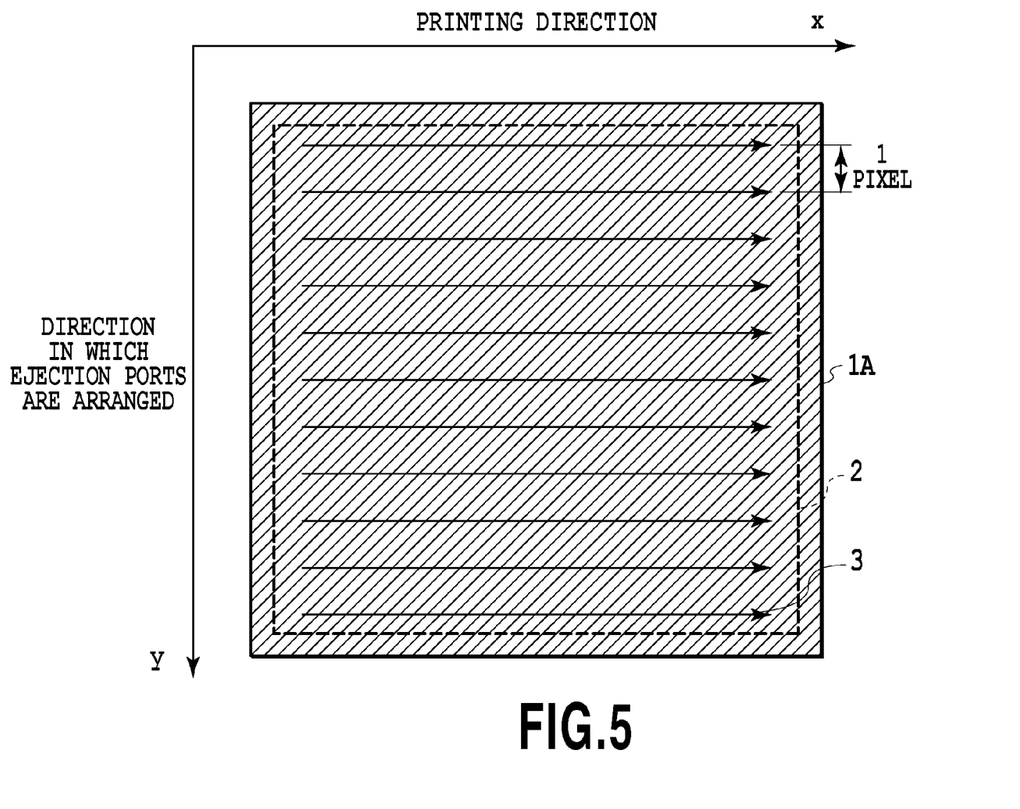
FIG. 5 is a diagram for explaining a measurement method of a printed image of an inspection pattern in the first embodiment of the present invention.

First, as shown in FIG. 5, an inspection area 2 is set within the taken image 1A of the inspection pattern 1. The inspection area 2 is set at a predetermined position within an imaging region in which the color mixing inspection pattern 1 is taken. A printing position of the inspection pattern 1 may be dislocated due to the variation in the positioning of the printing head 110. In consideration of such dislocation, the inspection area 2 is desirably set to be smaller than the inspection pattern 1 so that the inspection within the inspection area 2 can be performed even when the printing position of the inspection pattern 1 is dislocated.

As shown in FIG. 5, density values of the taken image 1A within the inspection area 2 are measured so that a predetermined unit (first predetermined unit) is measured in a direction (first direction) shown by an arrow 3 and then the subsequent predetermined units are measured one by one by shifting by a predetermined unit (second predetermined unit) in an ejection port arrangement direction (second direction). Specifically, the density of each first predetermined unit is measured (hereinafter also may be referred to as "measurement scan") in the direction shown by the arrow 3 by dividing a printed image into a plurality of divided regions in the ejection port arrangement direction. During each measurement scan in the direction shown by the arrow 3, each first predetermined unit is determined with regard to the existence or nonexistence of a part having a density change due to color mixing (density-changed part, i.e., a part having a density deviated from a predetermined allowable density). In the case of this example, the taken image 1A has a reduced density due to color mixing as described above. Thus, the occurrence of a color mixing can be detected when each first predetermined unit has a measurement density lower than a density threshold value set in advance.

In this example, the first predetermined unit is a printing pixel unit corresponding to the printing density in the printing direction (first direction). The second predetermined unit is a printing density corresponding to the printing density in the ejection port arrangement direction (second direction) and corresponds to a pitch between ejection ports.

The density-changed part having the measurement density equal to or lower than the predetermined density threshold value may be caused by the existence of foreign matters such as dust on the printing medium 118 on which the inspection pattern 1 is printed and the occurrence of a color mixing part in the inspection pattern 1. In order to distinguish these causing factors, it is determined whether or not the density-changed part having the measurement density equal to or lower than the predetermined density threshold value extends over a predetermined range or more in the first direction. In the case of this example, the existence of the density-changed part having the measurement density equal to or lower than the predetermined density threshold value is detected based on a printing pixel unit by counting the number of pixels having a measurement density equal to or lower than the predetermined density threshold value. Then, the count value is compared with a predetermined threshold (predetermined count value). In the case of this example, the number of pixels having a density value equal to or lower than the density threshold value is counted with regard to a measurement scan having the density value equal to or lower than the density threshold value. The following section will specifically describe a relation between the number of counted pixels (hereinafter also referred to as "count pixel number") and the taken image 1A.

Figure 6A:
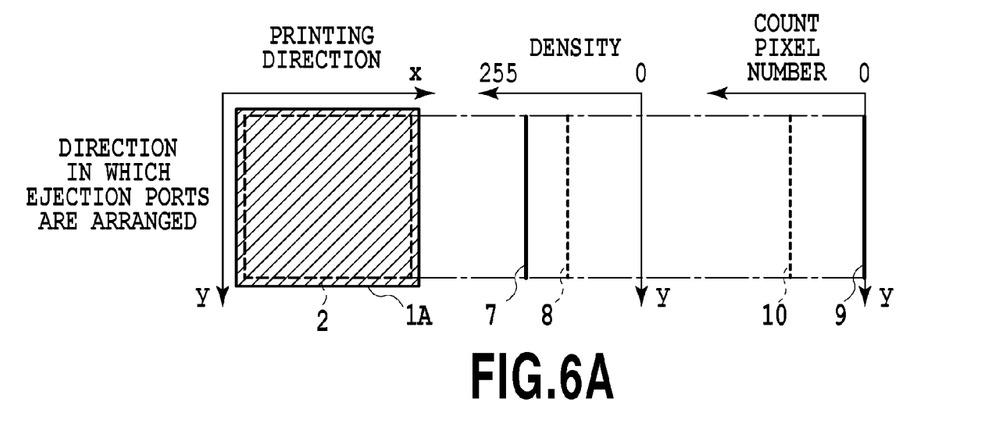
FIG. 6A and FIG. 6B are diagrams for explaining the measurement result of the printed image of the inspection pattern in the first embodiment of the present invention, respectively.
Figure 6B:
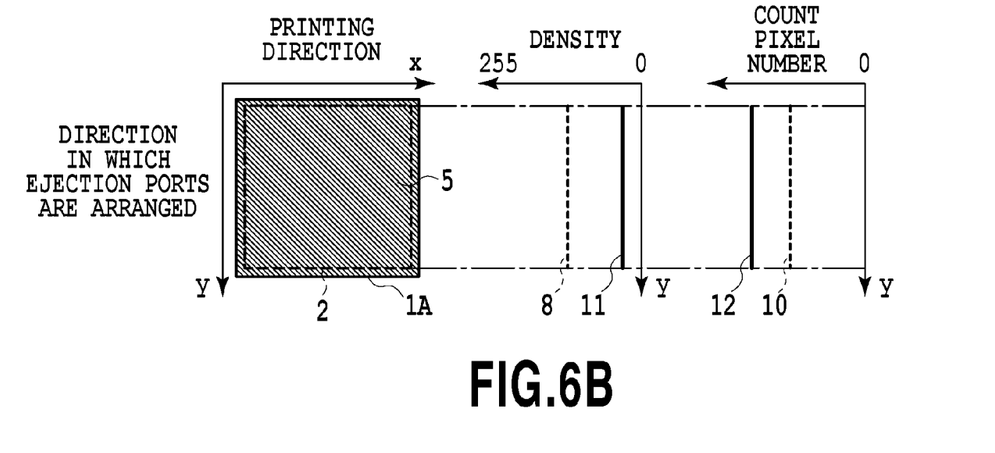
Figure 7A:
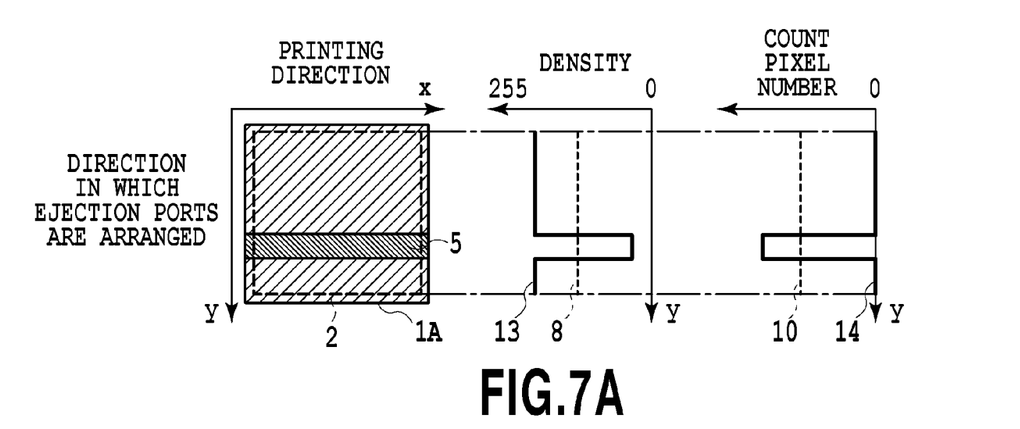
FIG. 7A and FIG. 7B are diagrams for explaining the measurement result of the printed image of the inspection pattern in the first embodiment of the present invention, respectively.
Figure 7B:
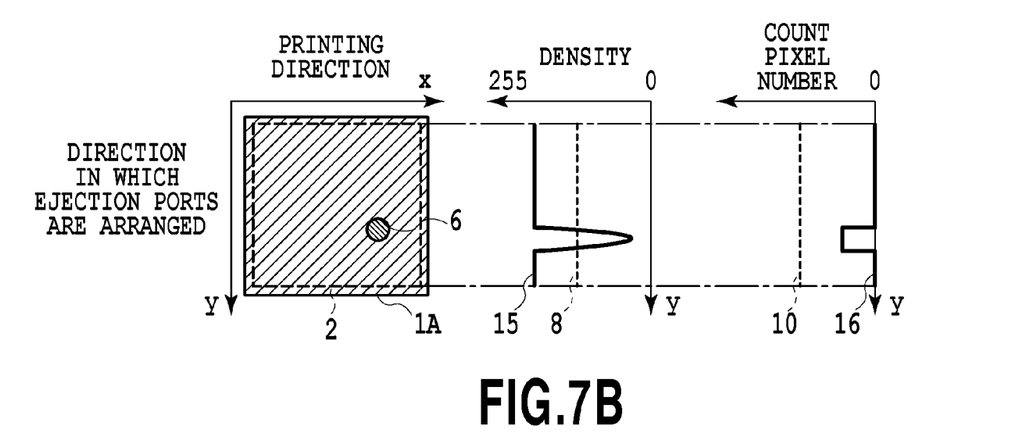

FIG. 6A illustrates an image processing result of the taken image 1A when no color mixing is caused. FIG. 6B illustrates an image processing result of the taken image 1A when a color mixing is caused in all regions. FIG. 7A illustrates an image processing result of the taken image 1A including a stripe-like color mixing part. FIG. 7B illustrates an image processing result of the taken image 1A when dust exists on the printing medium 118.

When a printing head includes therein the ink color mixing, mixed ink (color-mixed ink) is ejected through any ejection port 202. The ejection port 202 continuously ejects color-mixed ink during the printing scan in which ink is ejected through the printing head while allowing the printing head to move in the printing direction shown by the arrow x. Thus, when the color mixing occurs, a straight stripe extending in the printing direction appears at a position of the taken image 1A corresponding to the ejection port 202 through which the color-mixed ink is ejected. As described above, in the case of the inkjet printing method, the color mixing appears in a characterized manner. Thus, when the color-mixed ink is ejected through all ejection ports 202, the entire taken image 1A turns into a color-mixed part 5 as shown in FIG. 6B. When the color-mixed ink is ejected through a specific ejection port 202, a part corresponding to the specific ejection port 202 turns into the color-mixed part 5 as shown in FIG. 7A. A typical taken image 1A when the ink color mixing is caused in the printing head includes an image including the color-mixed part 5 as described above as shown in FIG. 6B and FIG. 7A.

When the color-mixed part 5 occurs as shown in FIG. 6B and FIG. 7A, density values 11 and 13 measured in Step S3 are lower than a density value 7 measured in Step S3 when no color mixing occurs as shown in FIG. 6A. By setting a density threshold value 8 between the former density values 11 and 13 and the latter density value 7, the occurrence of the color mixing can be determined based on the density threshold value 8 as a boundary. In the case of FIG. 6B, the entire taken image 1A has the density values 11 equal to or lower than the density threshold value 8. In the case of FIG. 7A, only the color-mixed part 5 in the taken image 1A has the density value 13 equal to or lower than the density threshold value 8.

When dust exists on the printing medium 118 as shown in FIG. 7B, a density change due to the dust occurs as in the case where the color mixing occurs. The part having the density change has the density value 15 equal to or lower than the density threshold value 8. Thus, it is difficult for the measurement using only the density value to discriminate the occurrence of the color mixing from the existence of dust.

In view of the above, in this embodiment, Step S4 described above counts the number of such pixels among all pixels in the measurement scan having the density threshold value 8 that has a density value equal to or lower than the density threshold value 8. As shown in FIG. 6B and FIG. 7A, when the color-mixed part 5 occurs, the color-mixed part 5 appears as the straight stripe extending in the printing direction shown by the arrow x. Thus, one measurement scan has an increased number of pixels (increased count pixel number) having the density value equal to or lower than the density threshold value 8. When dust exists as shown in FIG. 7B on the other hand, since the dust is small, one measurement scan has a reduced number of pixels having the density value equal to or lower than the density threshold value 8. As described above, even when a density change due to the color mixing and the density change due to dust are at a similar level, one measurement scan shows a different count pixel number. Thus, by setting a threshold value 10 of the count pixel number in advance, the occurrence of the color mixing can be discriminated from the existence of dust based on the threshold value 10 as a boundary. Specifically, the occurrence of the color mixing is detected when the count pixel number is equal to or higher than the threshold value 10 (i.e., when the count pixel number is equal to or higher than a predetermined count value). The threshold value 10 may be set, in consideration of the characteristic occurrence of the color mixing in the inkjet printing method, to a value corresponding to the entire range in the printing direction of the taken image 1A (i.e., a value similar to the total number of pixels in the respective measurement scans).

In the case of FIG. 6B, the count pixel number 12 equal to or lower than the density threshold value 8 is higher than the threshold value 10 in all measurement scans. In the case of FIG. 7A, the count pixel number 14 in the measurement scan corresponding to the color-mixed part 5 is equal to or higher than the threshold value 10. In the case of FIG. 7B, the count pixel number 16 in the measurement scan corresponding to the position having dust is not equal to or higher than the threshold value 10. As described above, in consideration of the characteristic occurrence of the color mixing in the inkjet printing method, the count pixel number is compared with the threshold value. Thus, the occurrence of the color mixing can be also discriminated from the existence of dust when the total amount of dust is high for example or when ink with small degree of the color mixing is ejected through all ejection ports in the ejection port array for example.

A method of counting the number of pixels includes a method as in this embodiment of directly counting the number of pixels having values equal to or lower than the density threshold value and a method of counting the number of pixels having values exceeding the density threshold value. In the former count method as in this embodiment, the number of pixels having values equal to or lower than the density threshold value (i.e., the number of pixels at a position having a color-mixed part or dust) is counted. In the latter count method, the number of pixels having values exceeding the density threshold value (i.e., the number of pixels at a position having no color-mixed part or dust) is counted, such a count value increases when no color-mixed part or dust exists and decreases when the color-mixed part or dust exists. In the case of the latter count method, the count value when dust exists is lower than count value when no color mixing occurs and is higher than the count value when the color mixing occurs. Any of the count methods can discriminate the occurrence of the color mixing from the existence of dust. However, in consideration of a case where no color mixing occurs, it is advantageous, from the viewpoint of an inspection tact, to use the count method of this embodiment for counting the number of pixels having values equal to or lower than the density threshold value (i.e., a method of counting the number of pixels at a position having a color-mixed part or dust).

In Step S5 of FIG. 3, as described above, the existence or nonexistence of the occurrence of the color mixing is determined based on the density value and the count pixel number at every measurement scan. Specifically, the printing head is determined as having the color mixing when any of the measurement scans shows that the density value is equal to or lower than the predetermined density threshold value 8 and the number of pixels having values equal to or lower than the density threshold value 8 is equal to or higher than a predetermined threshold value 10. The printing head is determined to be acceptable in the cases other than the above case. When the printing head is determined as having the color mixing, then a processing required with the determination of the occurrence of the color mixing (a processing corresponding to the determination of the occurrence of the color mixing) is performed by notifying the occurrence of the color mixing for example (Step S7). When the printing head is determined as acceptable, a processing corresponding to the determination of the acceptability is performed by notifying that the printing head is acceptable for example (Step S6).

As described above, in the case of the inkjet printing method, the color mixing occurs in a characterized manner and the straight stripe occurs that extends in the printing direction at a position corresponding to an ejection port through which color-mixed ink is ejected. In this embodiment, in consideration of the characteristic occurrence of the color mixing as described above, the occurrence of the color mixing is detected by determining whether the density-changed part in the printed image of the inspection pattern extends in the printing direction over a predetermined range or more. Thus, the occurrence of the color mixing can be detected accurately without causing an influence on dust on the printing medium.

Second Embodiment

Figure 8:
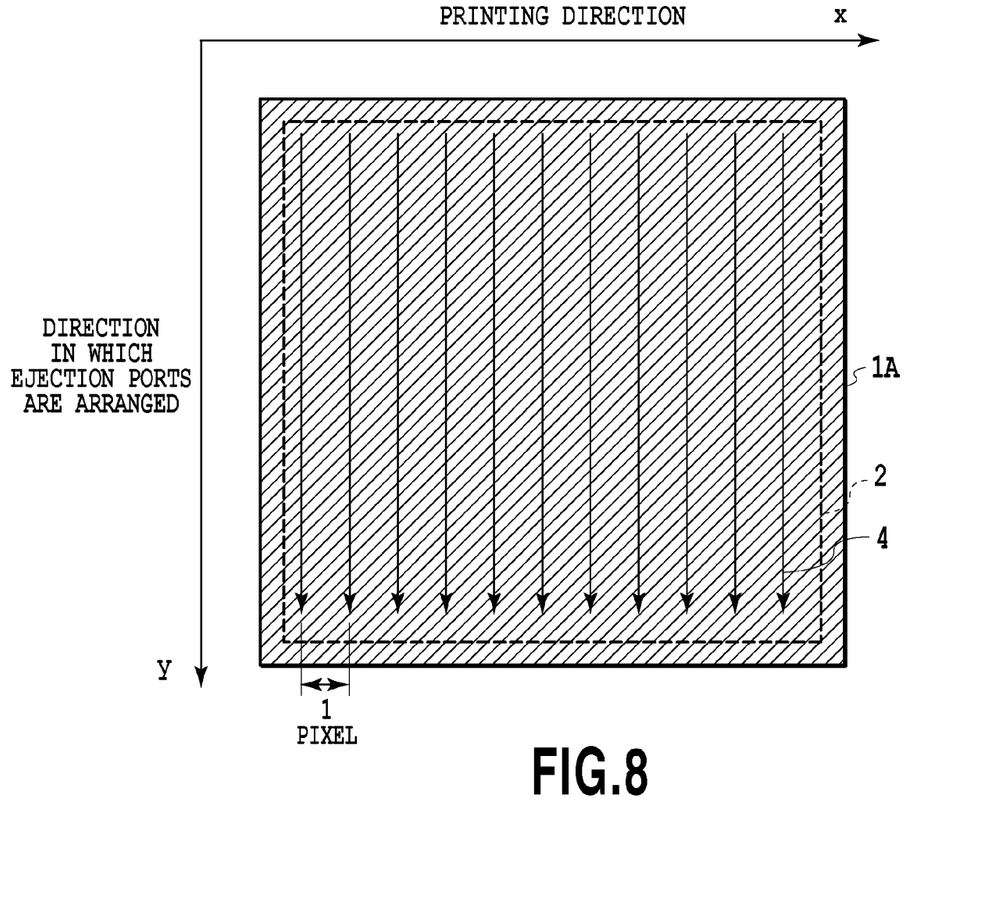
FIG. 8 is a diagram for explaining a measurement method of the printed image of the inspection pattern in the second embodiment of the present invention.

In this embodiment, as shown in FIG. 8, the density value of the taken image 1A of the inspection pattern is measured by measuring a density of respective positions, shifted by one pixel unit in the printing direction, in a direction shown by an arrow 4. At every measurement in the direction shown by the arrow 4 (hereinafter "measurement scan"), the density in the measurement scan is measured. Then, such a density value is compared with a density threshold value set in advance. Next, in the measurement scan including pixels having a density values equal to or lower than the density threshold value, the number of pixels having the density value equal to or lower than the density threshold value is counted (hereinafter also referred to as "count pixel number"). The measurement scan direction in the above-described embodiment is the printing direction shown by the arrow x. On the other hand, the measurement scan direction in this embodiment is a direction in which ejection ports are arranged in the arrow y (a direction in which the ejection port array extends).

Figure 9A:
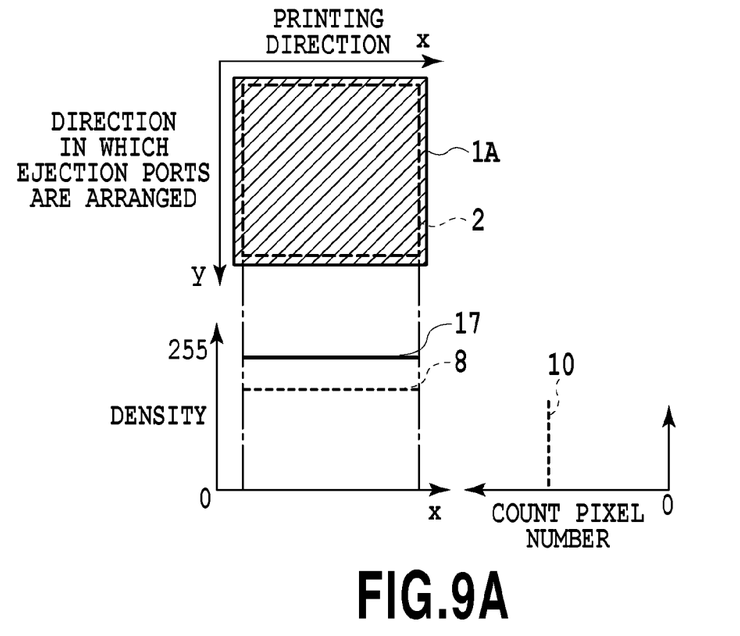
FIG. 9A and FIG. 9B are diagrams for explaining the measurement result of the printed image of the inspection pattern in the second embodiment of the present invention, respectively.
Figure 9B:
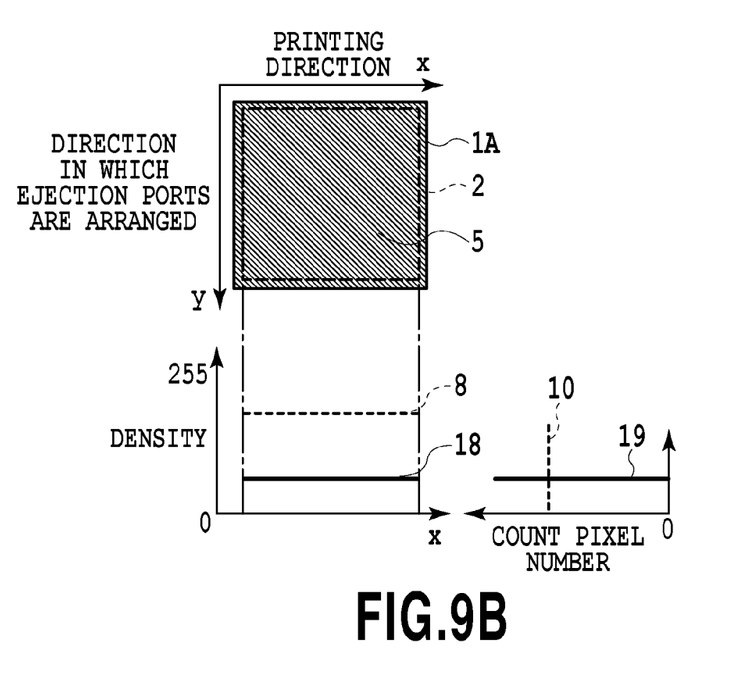
Figure 10A:
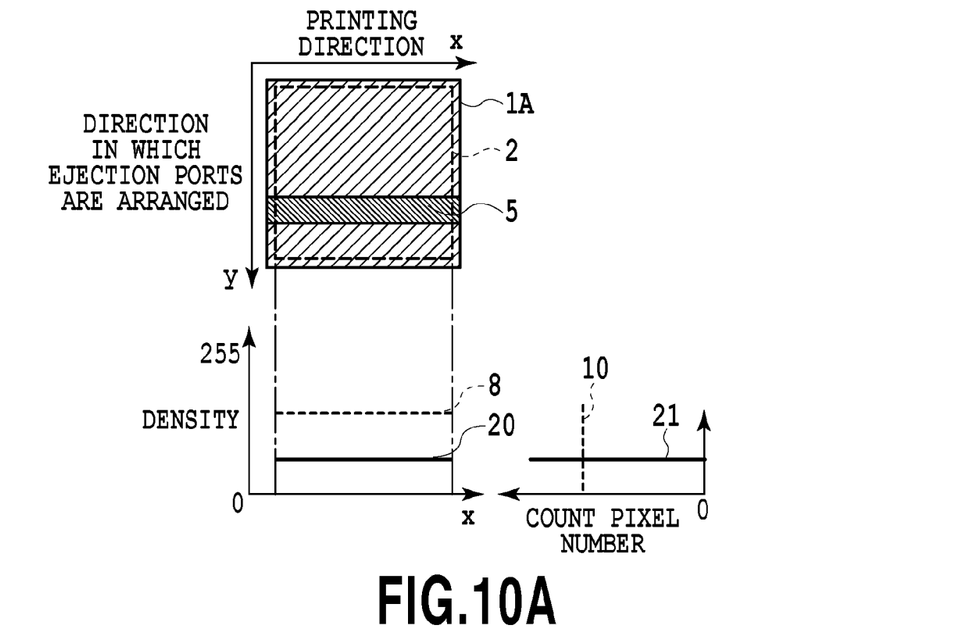
FIG. 10A and FIG. 10B are diagrams for explaining the measurement result of the printed image of the inspection pattern in the second embodiment of the present invention, respectively.
Figure 10B:
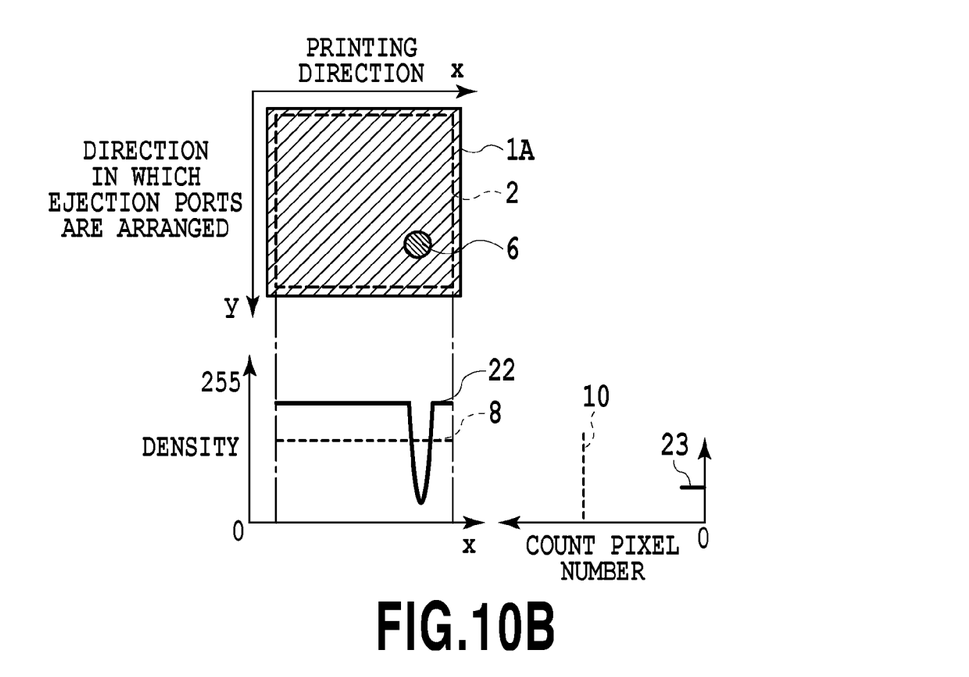

FIG. 9A illustrates the image processing result of the taken image 1A when no color mixing occurs. FIG. 9B illustrates the image processing result of the taken image 1A when all regions have color-mixed parts 5. FIG. 10A illustrates the image processing result of the taken image 1A including a stripe-like color-mixed part 5. FIG. 10B illustrates the image processing result of the taken image 1A when dust exists on the printing medium 118. The color mixing detection method of this embodiment has the same processings except for the direction of the measurement scan in the processing in Step S3 and Step S4 of FIG. 3 and the method of counting the number of pixels in the above-described embodiment.

When no color mixing occurs as in FIG. 9A, the density value 17 measured by the measurement scan has a certain fixed density value. When the color-mixed part 5 occurs as in FIG. 9B and FIG. 10A, similarly-measured density values 18 and 20 are lower than the case where no color-mixed part 5 occurs. Specifically, as in the first embodiment, by setting the density threshold value 8 between the density value with no color mixing and the density value with the color mixing, the existence or nonexistence of the color mixing can be determined based on the density threshold value 8 as a boundary. As in this embodiment, when a density value is measured by performing the measurement scan in the ejection port arrangement direction, the density values 18 and 20 in the case of FIG. 9B and FIG. 10A are equal to or lower than the density threshold value 8.

However, when dust exists on the printing medium as in FIG. 10B, a density change due to the dust occurs at the same level as that when the color mixing occurs. The density value 22 is equal to or lower than the density threshold value 8. Thus, it is difficult for the measurement of only the density value to discriminate, as in the case of the first embodiment, the occurrence of the color mixing from the existence of dust.

In view of the above, in this embodiment, in the measurement scan including a pixel having a density value equal to or lower than the density threshold value 8, the number of pixels having a density value equal to or lower than the density threshold value 8 is counted. The color-mixed part 5 occurring as in FIG. 9B and FIG. 10A appears in a characterized manner in that the color-mixed part 5 appears as a straight strip extending in the printing direction, and therefore the number of counted pixels (count pixel number) having a density value equal to or lower than the density threshold value 8 increases. When dust exists as in FIG. 10B on the other hand, since the dust is small, the count pixel number in one measurement scan decreases. As described above, even when a density change due to the color mixing and a density change due to dust are at a similar level, one measurement scan shows a different count pixel number. Thus, by setting the threshold value 10 of the number of pixel in advance, the occurrence of the color mixing can be discriminated from the existence of dust based on the threshold value 10 as a boundary. The threshold value 10 may be set, in consideration of the characteristic occurrence of the color mixing in the inkjet printing method, to a value corresponding to the entire range in the printing direction of the taken image 1A (i.e., a value similar to the total number of pixels in the respective measurement scans).

In the case of FIG. 9B and FIG. 10A, the numbers of pixels 19 and 21 equal to or lower than the density threshold value 8 are both equal to or higher than the threshold value 10. In the case of FIG. 10B, the number of pixels 23 equal to or lower than the density threshold value 8 is lower than the threshold value 10.

The method of counting the number of pixels may, as in the case of the above-described embodiment, be a method of counting the number of pixels exceeding the density threshold value (i.e., the number of pixels at a position having no color-mixed part or dust). Any of the count methods can discriminate the occurrence of the color mixing from the existence of dust. However, in consideration of the case where no color mixing occurs, it is advantageous, from the viewpoint of an inspection tact, to use the count method of this embodiment of counting the number of pixels equal to or lower than the density threshold value (i.e., a method of counting the number of pixels at positions having a color-mixed part or dust).

Third Embodiment

This embodiment uses a photographing method that can improve the color mixing inspection capability in the above-described first and second embodiments. By using the photographing method of this embodiment, a density difference between a color mixing part and a no-color mixing part can be more clarified. This embodiment is different from the first and second embodiments only in the above-described photographing method in Step S2 of FIG. 3. Thus, the following section will describe only the difference.

Figure 11:
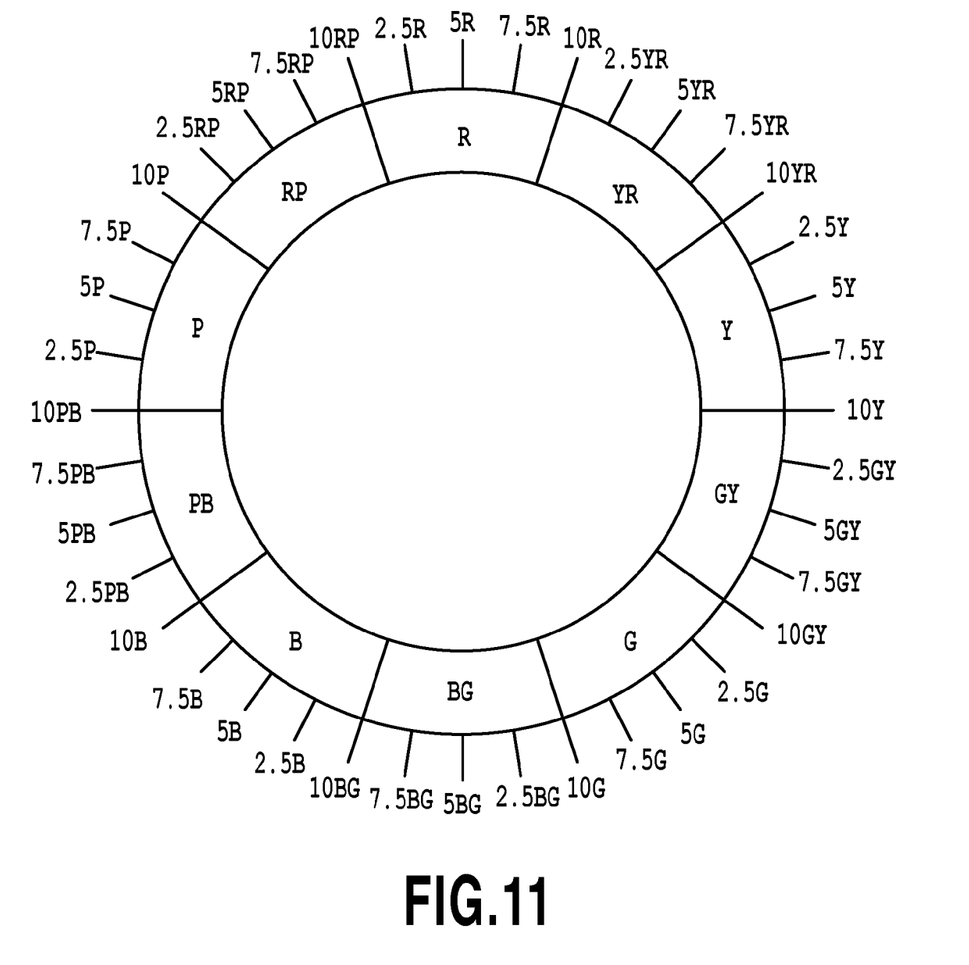
FIG. 11 is a diagram for explaining a color circle.

FIG. 11 is a color circle diagram standardized based on JISZ 8721 (a method of representing a color based on three attributes). A hue can be represented by a combination of color circle symbols (R, Y, G, B, and P) and a number (e.g., 2.5 and 10). In this color circle, "R" represents red, "Y" represents yellow, "G" represents green, "B" represents blue, and "P" represents purple, respectively. As intermediate hues among them, "YR" represents yellow red, "GY" represents green yellow, "BG" represents blue green, "PB" represents purple blue, and "RP" represents red purple, respectively. Generally, this color circle is configured so that hues positioned directly opposite to each other have a complementary color relation.

In this embodiment, as in the above-described first and second embodiments, the inspection pattern 1 is illuminated in Step S2 of FIG. 3 for photographing. During this, an illumination color to the inspection pattern 1 is a complementary color to an ink color having a possibility of the color mixing, the illumination color being positioned directly opposite to the ink color in the color circle of FIG. 11. In the case of this example, two inks having supply paths adjacent to each other in the printing head are assumed as ink having a high possibility of the color mixing. Specifically, it is assumed that, when the inspection pattern 1 is printed by one of these two inks, the other ink has a possibility of the color mixing, thereby the inspection pattern 1 is illuminated by a color that is a complementary color to the other ink color. As described above, the inspection pattern 1 is illuminated by a color that is a complementary color to a color assumed to be color-mixed with the color of the printed ink. Then, the inspection pattern 1 is photographed and the imaging data is read by the image processing section 105 (see FIG. 1).

In this example, a supply path for supplying cyan ink to an ejection port is adjacent to a supply path for magenta ink. Thus, when the inspection pattern 1 is printed by cyan ink, it is assumed that magenta ink may be color-mixed. In the color circle of FIG. 11, magenta is RP and the hue positioned directly opposite to RP is G. Thus, when the inspection pattern 1 is printed by cyan ink, the inspection pattern 1 is photographed by being illuminated by the G color functioning as a complementary color to RP. The G color illumination preferably has a hue of any of 2.5G, 5G, 7.5G, and 10G.

In this example, a magenta ink supply path is adjacent to a cyan ink supply path and a yellow ink supply path. Thus, when the inspection pattern 1 is printed by magenta ink, it is assumed that cyan ink and yellow ink may be color-mixed. Thus, when the inspection pattern 1 is printed by magenta ink, the inspection pattern 1 is photographed two times based on two steps.

In the first step, the inspection pattern 1 is photographed by being illuminated by a complementary color to cyan. Specifically, in the color circle of FIG. 11, cyan is BG and the hue positioned directly opposite to BG is R. Thus, the pattern is taken by being illuminated with the R color functioning as a complementary color to BG. The illumination by the R color preferably has a hue of any of 2.5R, 5R, 7.5R, and 10R. In the second step, the pattern is photographed by being illuminated by a color functioning as a complementary color to yellow. Specifically, in the color circle of FIG. 11, yellow is Y and a hue positioned directly opposite to Y is PB. Thus, the pattern is taken by being illuminated by a PB color functioning as a complementary color Y. The illumination by the PB color preferably has a hue of any of 2.5PB, 5PB, 7.5PB, and 10PB. The first and second steps as described above may be performed in a reverse order.

In this example, the supply path for supplying yellow ink to the corresponding ejection port is adjacent to the magenta ink supply path. Thus, when the inspection pattern 1 is printed by yellow ink, it is assumed that magenta ink may be color-mixed. In the color circle of FIG. 11, magenta is RP and the hue positioned directly opposite to RP is G. Thus, when the inspection pattern 1 is printed by cyan ink, the inspection pattern 1 is photographed by being illuminated by the G color functioning as a complementary color to RP. The illumination by the G color preferably has a hue of any of 2.5G, 5G, 7.5G, and 10G.

After the inspection pattern is taken as described above, a color mixing inspection method is performed as in the above-described first and second embodiments.

The ink color assumed to have the color mixing is limited by a structure of the printing head. Thus, the ink color for printing the inspection pattern is illuminated with light having a color functioning as a complementary color to the ink for which the color mixing is assumed. As a result, the pattern can be taken with a highlighted color-mixed ink. As a result, a density difference between the color mixing part and the no-color mixing part can be more clarified, thus improving the color mixing inspection capability.

Fourth Embodiment

This embodiment uses a photographing method that can improve the color mixing inspection capability in the above-described first and second embodiments. By using the photographing method of this embodiment, a density difference between the color mixing part and the no-color mixing part can be more clarified. Furthermore, when an ejection port has an ink ejection failure or a dislocated ink eject direction and thus the inspection pattern has a changed color shade, the changed color shade is prevented from being misjudged as being caused by the color mixing and the occurrence of the color mixing can be detected. This embodiment is different from the first and second embodiments only in the above-described photographing method in Step S2 of FIG. 3. Thus, the following section will describe the difference only.

In this embodiment, as in the case of the first and second embodiments, the inspection pattern 1 is illuminated and photographed in Step S2 of FIG. 3. During this, the inspection pattern 1 is illuminated by a color determined in consideration of a complementary color to an ink color easily having the color mixing and an ink color for printing the inspection pattern 1. The complementary color is positioned directly opposite to the ink color easily having the color mixing in the color circle of FIG. 11.

In this example, the supply path for supplying cyan ink is adjacent to the magenta ink supply path. Thus, when the inspection pattern 1 is printed by cyan ink, it is assumed that magenta ink may be color-mixed. In the color circle of FIG. 11, cyan is BG, magenta is RP, and a hue positioned directly opposite to RP is G. Thus, when the inspection pattern 1 is printed by cyan ink, the inspection pattern 1 is photographed by being illuminated with a modulated color positioned between BG (cyan) and the G color functioning as a complementary color to RP in the color circle of FIG. 11. The modulated illumination preferably has a hue of any of 10G, 2.5BG, and 5BG.

In this example, the magenta ink supply path is adjacent to the cyan ink supply path and the yellow ink supply path. Thus, when the inspection pattern 1 is printed by magenta ink, it is assumed that cyan ink may be color-mixed with yellow ink. Thus, when the inspection pattern 1 is printed by magenta ink, the pattern is photographed two times based on two steps.

In the first step, the illumination color is determined in consideration of magenta and the complementary color to cyan. Specifically, in the color circle of FIG. 11, magenta is RP, cyan is BG, and a hue positioned directly opposite to BG is R. Thus, in the color circle of FIG. 11, the pattern is photographed by being illuminated with a modulated color positioned between RP (magenta) and the R color as a complementary color to BG. The modulated illumination preferably has a hue of any of 10RP, 2.5R, and 5R. In the next second step, the illumination color is determined in consideration of magenta and the complementary color to yellow. Specifically, in the color circle of FIG. 11, magenta is RP, yellow is Y, and a hue positioned directly opposite to Y is PB. Thus, in the color circle f FIG. 11, the pattern is photographed by being illuminated with a modulated color positioned between RP (magenta) and the PB color as a complementary color to Y. The modulated illumination preferably has a hue of any 10PB, 2.5P, and 5P. The first and second steps as described above may be performed in a reverse order.

In this example, the supply path for supplying yellow ink to the corresponding ejection port is adjacent to the magenta ink supply path. Thus, it is assumed that, when the inspection pattern 1 is printed by yellow ink, magenta ink may be color-mixed. In the color circle of FIG. 11, yellow is Y, magenta is RP, and a hue positioned directly opposite to RP is G. Thus, when the inspection pattern 1 is printed by yellow ink, the pattern is photographed by being illuminated with a modulated color positioned between Y (yellow) and the G color as a complementary color to RP in the color circle of FIG. 11. The modulated illumination preferably has a hue of any of 5GY, 7.5GY, and 10GY.

As described above, after the inspection pattern is photographed, the color mixing inspection method is carried out as in the above-described the first and second embodiments.

According to this embodiment, the inspection pattern 1 is illuminated with a modulated color positioned between a color of ink for printing the inspection pattern 1 and a color functioning as a complementary color to a color of ink for which a color mixing is assumed in the color circle as shown in FIG. 11. As a result, the resultant photographed image has a reduced density difference between the inspection pattern 1 and a margin. Thus, when the printing of the inspection pattern 1 is performed with an ink ejection failure or a dislocated ink ejection direction, an influence on the photographed image by the color shade caused by such a failure or dislocation can be minimized. Thus, a density difference between a color mixing part and a no-color mixing part can be more clarified. In addition, when an ejection port has an ink ejection failure or a dislocated ink eject direction and thus an inspection pattern has a changed color shade, the changed color shade is prevented from misjudged as being caused by the color mixing, thereby improving the color mixing inspection capability.

Other Embodiments

An inkjet printing head includes an inkjet printing head formed separately from an ink tank so as to be detachable to the ink tank and a printing head cartridge integrated with an ink tank for example.

The color mixing detection system as shown in FIG. 1 may constitute the color mixing detection apparatus or also may be provided in the inkjet printing apparatus. The inkjet printing apparatus can allow the printing head and the printing medium to move relative to each other while ejecting ink through an ejection port, thereby printing a desired image on a printing medium. During this, a color image can be printed by ejecting a plurality of color inks through ejection ports of the printing head. The printing method of the inkjet printing apparatus is not limited. For example, the method may be a serial scan method using the printing scan by the printing head and the transportation of the printing medium or also may be a full line-type method to continuously transport a printing medium to a printing head at a fixed position.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-181556 filed Sep. 2, 2013, which is hereby incorporated by reference herein in its entirety.

What is claimed is:

1. A method for detecting an occurrence of a color mixing of ink in an inkjet printing head that can eject at least first and second inks having different colors, comprising:
 a printing step of allowing the printing head and a printing medium to move relative to each other in a first direction while allowing the first ink to be ejected through the printing head so that an inspection pattern having a uniform density is printed on the printing medium by the first ink;
 a density measurement step of measuring a density of a printed image of the inspection pattern; and
 a detection step of detecting the occurrence of the color mixing of the first and second inks when a density-changed part in the printed image in which the density measured by the density measurement step deviates from an allowable density continuously extends in the first direction for a predetermined range or more.

2. The color mixing detection method according to claim 1, wherein the predetermined range is the entire range in the printed image in the first direction.

3. The color mixing detection method according to claim 1, wherein the detection step detects the occurrence of the color mixing when a count value is equal to or higher than a predetermined count value, the count value being obtained by counting, based on a first predetermined unit, a length of the density-changed part continuously extending in the first direction.

4. The color mixing detection method according to claim 3, wherein the first predetermined unit is a printing pixel unit.

5. The color mixing detection method according to claim 1, wherein the printing head includes an ejection port array in which a plurality of ejection ports that can eject the first ink are arranged in a second direction intersecting with the first direction; and
 the printing step prints the inspection pattern by moving the printing head and the printing medium relative to each other in the first direction while allowing the first ink to be ejected through the plurality of ejection ports.

6. The color mixing detection method according to claim 5, wherein the detection step detects the occurrence of the color mixing when at least one of a plurality of regions obtained by dividing the printed image based on a second predetermined unit in the second direction includes the density-changed part continuously extending in the first direction for the predetermined range or more.

7. The color mixing detection method according to claim 6, wherein the second predetermined unit is a printing pixel unit.

8. The color mixing detection method according to claim 1, wherein the printing step prints the inspection pattern with a 100% printing duty.

* * * * *